(12) United States Patent
Hergert (10) Patent No.: US 7,574,286 B2
(45) Date of Patent: Aug. 11, 2009

(54) POWER CONTROL FOR PIVOT WELL IRRIGATION AND OTHER ELECTRICAL MACHINERY

(75) Inventor: C. David Hergert, Scottsbluff, NE (US)

(73) Assignee: David C. Hergert, Scottsbluff, NE (US)

( * ) Notice: Subject to any disclaimer, the term of this patent is extended or adjusted under 35 U.S.C. 154(b) by 326 days.

(21) Appl. No.: 11/207,671

(22) Filed: Aug. 19, 2005

(65) Prior Publication Data

US 2007/0043480 A1 Feb. 22, 2007

(51) Int. Cl.
H02J 13/00 (2006.01)
(52) U.S. Cl. .................. 700/295; 700/286
(58) Field of Classification Search .......... 700/14, 700/16, 286, 284, 295; 137/324.11
See application file for complete search history.

(56) References Cited

U.S. PATENT DOCUMENTS

| | | | | |
|---|---|---|---|---|
| 3,987,308 A | * | 10/1976 | Burch | 307/41 |
| 6,108,590 A | * | 8/2000 | Hergert | 700/284 |
| 6,337,971 B1 | * | 1/2002 | Abts | 340/7.2 |
| 7,015,595 B2 | * | 3/2006 | Feddersen et al. | 290/44 |
| 2003/0193405 A1 | * | 10/2003 | Hunt et al. | 340/870.02 |
| 2003/0233201 A1 | * | 12/2003 | Horst et al. | 702/62 |
| 2006/0095164 A1 | * | 5/2006 | Donnelly et al. | 700/295 |
| 2007/0005195 A1 | * | 1/2007 | Pasquale et al. | 700/295 |
| 2007/0126571 A1 | * | 6/2007 | Bonicatto et al. | 340/538.11 |

* cited by examiner

Primary Examiner—Kidest Bahta
(74) Attorney, Agent, or Firm—Merchant & Gould PC (57) ABSTRACT

The embodiments presented in this disclosure provide for systems and methods to control electrical machinery. In embodiments, the systems and methods control electrical machinery according to the usage of power on a power grid compared to the peak usage for that power grid. In one embodiment, a system receives a peak usage parameter, receives a current megawatt usage for the power grid, compares the current megawatt usage to the peak usage parameter, and powers off one or more electrical machines connected to the power grid if the current megawatt usage is near the peak usage parameter.

17 Claims, 7 Drawing Sheets

POWER CONTROL FOR PIVOT WELL IRRIGATION AND OTHER ELECTRICAL MACHINERY

TECHNICAL FIELD

The present invention relates, in general, to control systems for pivot well irrigation and other electrical machinery.

BACKGROUND

Irrigation pumping systems for pivot well irrigation require a great deal of electrical power. The rural electrical cooperatives and power companies generally price the power to the farmer according to system supply availability. At peak demand, the power companies generally charge a premium to any user of electricity during the peak usage period. Peak demand or the peak usage period is generally a short period of time, possibly one to two hours, when the power system is at or near its system supply capability.

Since irrigation pumps and/or electrical machines consume a great deal of power, when used during the peak usage period, the farmer or operator generally pays a premium for the power. This premium can be, in some cases, thousands of dollars per month, which increases the cost of farming or operating the machinery and reduces profits. In addition, the power company must meet the electrical production requirements of all the electrical machinery being supplied power. The demands of all the machines are large and necessitate the expenditure of significant resources.

It is with respect to these and other considerations that the present invention has been made.

SUMMARY

The embodiments presented in this disclosure provide for systems and methods to control electrical machinery to reduce potential peak-usage premium payments. In one embodiment, a method for controlling electrical machinery comprises receiving a peak usage parameter, receiving a current megawatt usage for a power grid, comparing the current megawatt usage to the peak usage parameter, and powering off one or more electrical machines connected to the power grid if the current megawatt usage is near the peak usage parameter. In another embodiment of a method for controlling electrical machinery, the method comprises receiving a power request from an electrical power user, receiving a power demand for one or more electrical machines, determining if one or more electrical machines can be powered off to meet the power request, and if one or more electrical machines can be powered off, powering off the one or more electrical machines to meet the power request.

In another embodiment, a system for controlling electrical machinery, comprises one or more electrical machines connected to one or more power grids, one or more central computer controls, communicatively coupled to one or more electrical machines, that control one or more of the electrical machines, and a command post computer, communicatively coupled to the one or more central computer controls, that compares a peak usage parameter and a megawatt usage for the one or more power grids and sends a power off request to one or more central computer controls to relay the power off request to one or more electrical machines.

The invention may be implemented as a computer process, a computing system or as an article of manufacture such as a computer program product. The computer program product may be a computer storage medium readable by a computer system and encoding a computer program of instructions for executing a computer process. The computer program product may also be a propagated signal on a carrier readable by a computing system and encoding a computer program of instructions for executing a computer process.

A more complete appreciation of the present invention and its improvements can be obtained by reference to the accompanying drawings, which are briefly summarized below, and to the following detailed description of exemplary embodiments of the invention, and to the appended claims.

DETAILED DESCRIPTION

Embodiments will now be described more fully hereinafter with reference to the accompanying drawings. The embodiments may, however, assume many different forms and should not be construed as limited to the embodiments set forth herein. Rather, these embodiments are provided so that the disclosure will be thorough and complete and will fully convey the scope of the possible embodiments to those skilled in the art.

Figure 1:
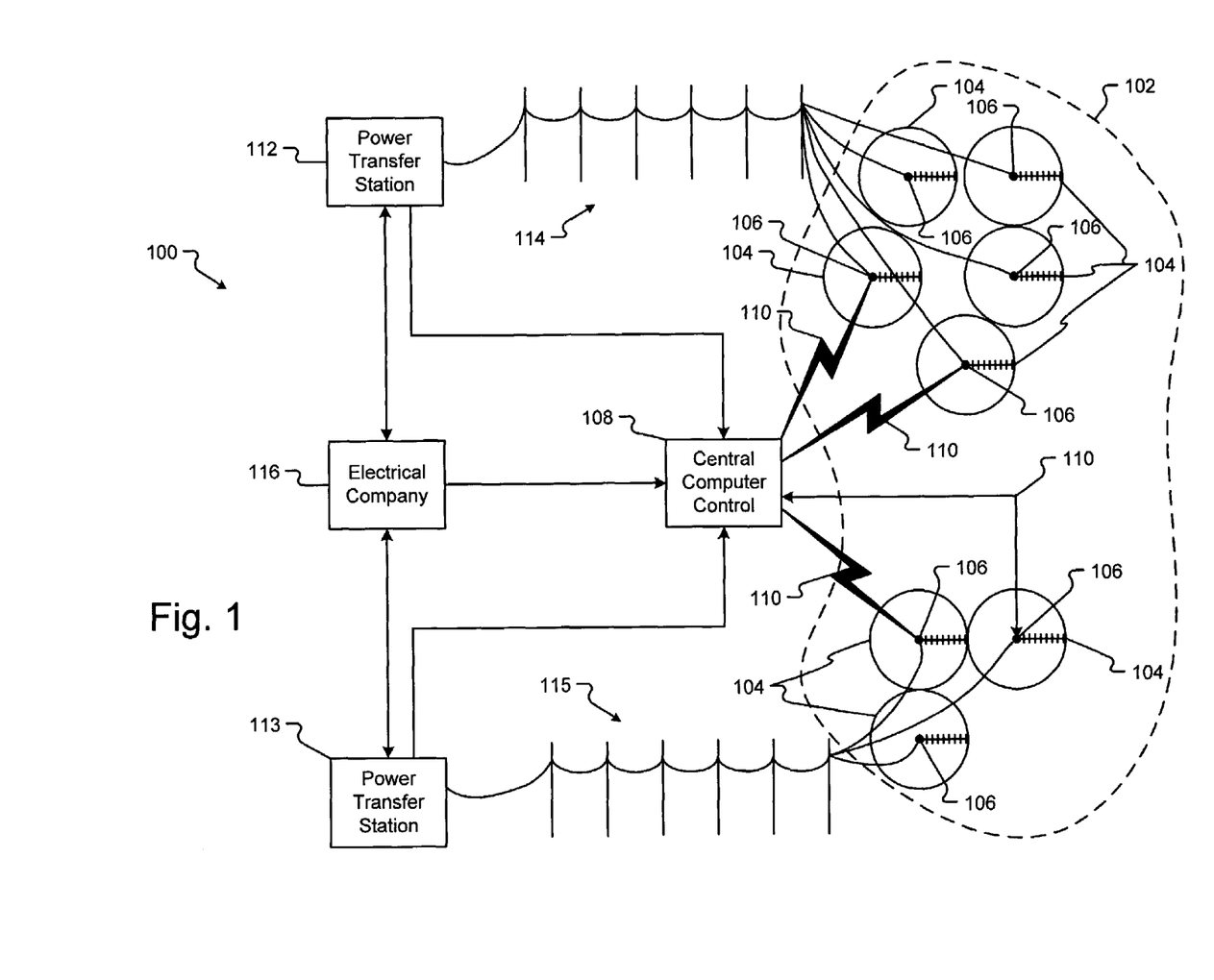
FIG. 1 is a schematic plan view of a large agricultural area having a number of operational pivot irrigation systems.

Referring now to FIG. 1, a partial plan view 100 of a geographical agricultural area 102 is shown. The area 102 is representative of a relatively large agricultural area typically covering a number of counties. The area 102 includes a significant number of irrigation units 104 which operate to supply water, chemicals, and other application substances to the fields over which they operate. As is shown, these units are center pivot irrigation systems. However, the system and method in accordance with the present invention may also be utilized with other irrigation systems, such as part circle systems and traveling systems. The center pivot systems predominate in the agricultural arena and therefore are illustrated and are exemplary here.

The present disclosure also applies to other relatively large-scale irrigation systems, such as those systems used for golf courses, greenbelts, commercial and municipal grounds and parks and other managed irrigation areas. In addition, the present disclosure also relates to other systems composed of a plurality of electrical machines coupled to a control system, such as oil wells, irrigation valves, etc. Accordingly, throughout this specification, when an agricultural system of pivots is described, it is to be understood that the pivot devices are exemplary only and any electrical machine may be substituted and is within the scope of the possible embodiments.

In embodiments, each of the pivot units 104 also includes a transceiver 106, which gathers and transmits pivot operational data, such as water flow rate, electrical power status, etc., to a central computer control 108 and receives commands from the central computer control 108 to control the power on, power off, and other operations of the pivot pumping equipment and drive motors. In embodiments, the central control computer 108 is communicatively coupled to and communicates with the transceivers 106 via a connection 110. Connection 110 may or may not be a wireless connection. Thus, in embodiments, a single central control computer 108 can control the operation of a plurality of pivots 104 spread over a very large geographic area. In embodiments, the pivot irrigation systems 104 are supplied electrical power by one or more power transfer stations 112 and 113 via one or more power grids 114 and 115. The power transfer station operations can be monitored and controlled by one or more electrical companies 116.

In embodiments, the central computer control 108 receives information or data from the power transfer stations 112 and 113 and/or the electrical company 116. This information can include, but is not limited to, the current megawatt usage for the power grids 114 and 115, the level at which the power usage reaches a peak usage, and/or the rates for power used on the power grids 114 and 115. The peak usage is an amount of power being consumed either on a single power grid 114 or by all power grids 114 and 115 supplied by the electrical company 116 that indicates a higher and/or highest cost of power. Generally, electrical companies 116 charge a premium for power consumed during peak usage. In addition, peak usage generally lasts for a short period of time, such as an hour or two. In embodiments, the central computer control 108 monitors the megawatt usage for one or more power grids 114 and 115 supplying power to one or more pivot wells 104. When the megawatt usage nears the peak usage, the central computer control 108 can command one or more pivot wells 104 to power off and thus, avoid paying a premium for electricity when operating the pivot wells 104.

Figure 2:
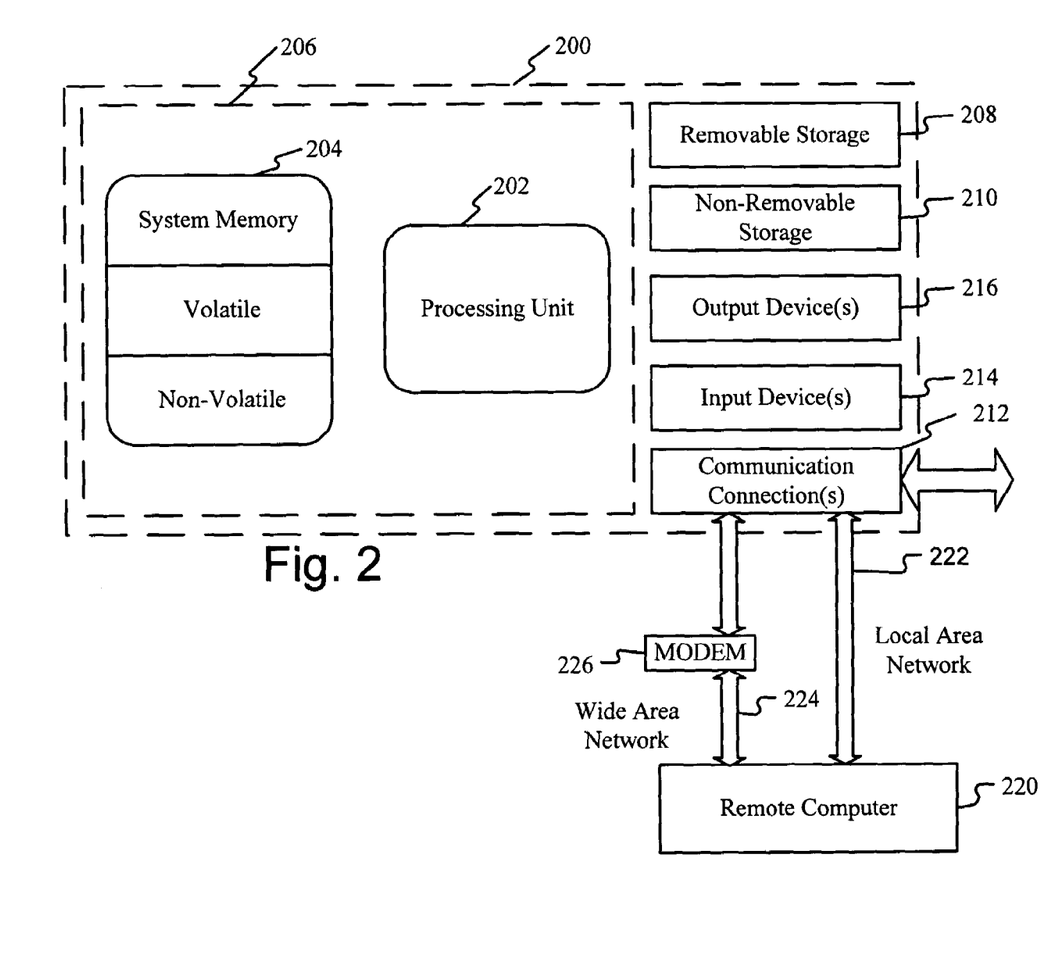
FIG. 2 is a functional diagram illustrating a computer environment and computing device operable to provide a system to control electrical machines in accordance with the present disclosure.

An example of a suitable operating environment in which the invention may be implemented is illustrated in FIG. 2. The operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

With reference to FIG. 2, an exemplary system for implementing the invention includes a computing device, such as computing device 200. In its most basic configuration, computing device 200 typically includes at least one processing unit 202 and memory 204. Depending on the exact configuration and type of computing device, memory 204 may be volatile (such as RAM), non-volatile (such as ROM, flash memory, etc.), or some combination of the two. The most basic configuration of the computing device 200 is illustrated in FIG. 2 by dashed line 206. Additionally, device 200 may also have additional features or functionality. For example, device 200 may also include additional storage (removable and/or non-removable) including, but not limited to, magnetic or optical disks or tape. Such additional storage is illustrated in FIG. 2 by removable storage 208 and non-removable storage 210. Computer storage media includes volatile and nonvolatile, removable and non-removable media implemented in any method or technology for storage of information, such as computer readable instructions, data structures, program modules, or other data. Memory 204, removable storage 208 and non-removable storage 210 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by device 200. Any such computer storage media may be part of device 200.

Device 200 may also contain communications connection(s) 212 that allow the device to communicate with other devices. Communications connection(s) 212 is an example of communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media.

Device 200 may also have input device(s) 214 such as keyboard, mouse, pen, voice input device, touch input device, etc. Output device(s) 216 such as a display, speakers, printer, etc. may also be included. The devices 200 may help form the systems shown in FIG. 1. All these devices are well know in the art and need not be discussed at length here.

Computing device 200 typically includes at least some form of computer readable media. Computer readable media can be any available media that can be accessed by processing unit 202. By way of example, and not limitation, computer readable media may comprise computer storage media and communication media. Combinations of the any of the above should also be included within the scope of computer readable media.

The computer device 200 may operate in a networked environment using logical connections to one or more remote computers 220. The remote computer may be a personal computer, a server computer system, a router, a network PC, a peer device, another computer system, or other common network node, and typically includes many or all of the elements described above relative to the computer device 200. The logical connections between the computer device 200 and the remote computer may include a local area network (LAN) 222, a wide area network (WAN) 224, or other networks, such as a satellite connection. Such networking environments are commonplace in offices, enterprise-wide computer networks, intranets, and the Internet.

When used in a LAN networking environment, the computer device 200 is connected to the LAN through a network interface or adapter. When used in a WAN networking environment, the computer device 200 typically includes a modem 226 or other means for establishing communications over the WAN, such as the Internet. The modem 226, which may be internal or external, may be connected to the computer processor 202 via the communication connections 212, or other appropriate mechanism. In a networked environment, program modules or portions thereof may be stored in the remote memory storage device. By way of example, and not limitation, remote application programs may reside on memory device connected to the remote computer system. It will be appreciated that the network connections explained are exemplary and other means of establishing a communications link between the computers may be used.

Figure 3:
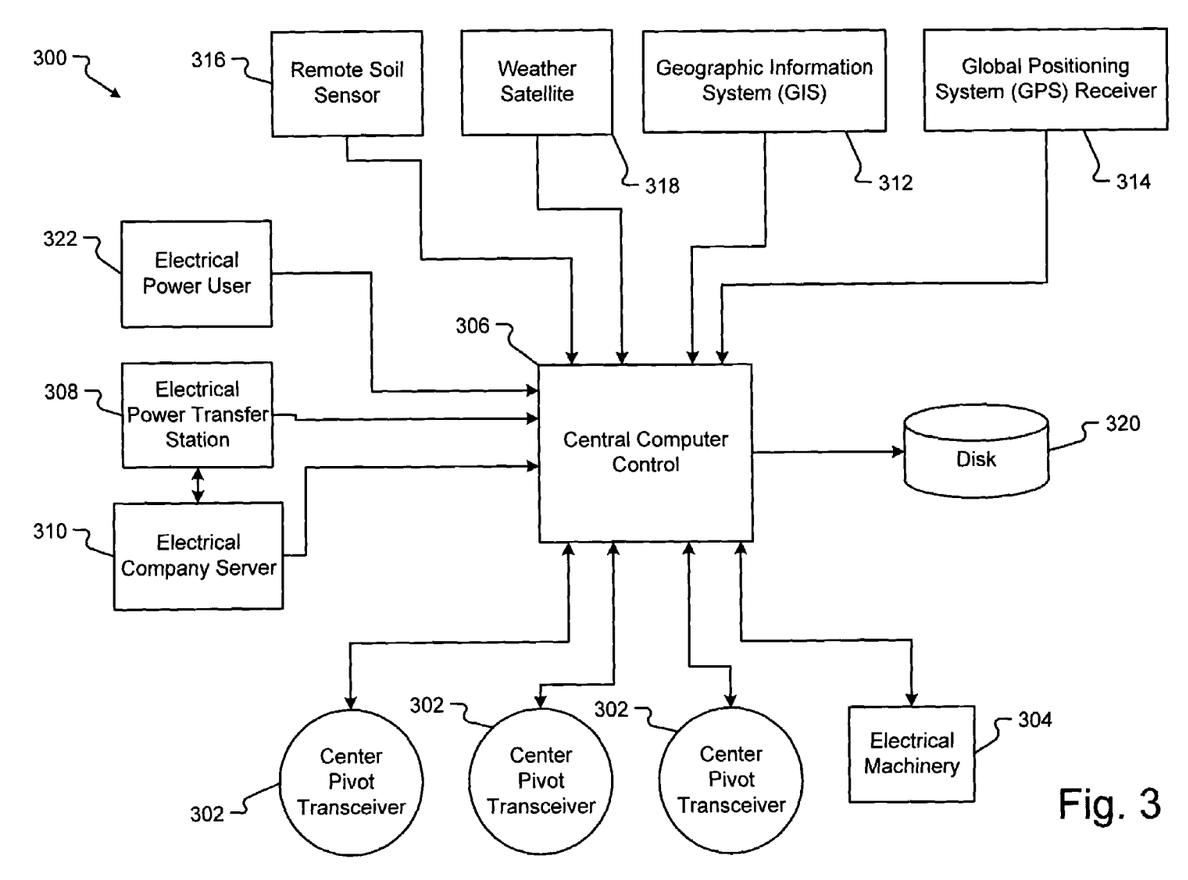
FIG. 3 is a block diagram of the irrigation control system in accordance with the present disclosure.

A block diagram of an embodiment of a system 300 to control electrical machinery is shown FIG. 3. The system 300 may be used to control a plurality of irrigation systems 302 or other electrical machinery 304. In embodiments, the system 300 comprises a programmable central computer control 306 located at a business or farmhouse. The central computer control 306 controls the operation of irrigation pumps, central pivots 104 (FIG. 1), and/or sprinkler head devices to provide irrigation to a particular soil section, such as the agricultural area 102 shown in FIG. 1. It is to be understood that the area 102 (FIG. 1) may alternatively be a golf course, a park, or other network of irrigation devices.

In embodiments, each of the center pivots 302 carries a transceiver and remote controller, such as transceiver 106 (FIG. 1), for controlling the pivot pumps and motors. This remote controller starts and stops the pivot pump, monitors operational hours, controls optional additive pumps, and provides status signals to the central computer control 306 for monitoring purposes. The pivot 302 may optionally include sensors, which provide environmental parameter signals to the transceiver that are sent to the central computer control 306 for processing. In other embodiments, sensors may be employed by satellites, such as infrared sensors, and provide the sensor data to the central computer control 306 or other system.

The central computer control 306 is communicatively coupled to and receives information signals from an electrical power transfer station 308 and/or from an electrical company server 310. The input from the power transfer station 308 is used to monitor the demand on the power grid(s) and/or transmit signals from the electrical company server 310 as to the most economical time to operate the pivot pumps and drive motors based on electrical system demand. In one embodiment, the input information is sent over the Internet to the central computer control 306, and, in other embodiments, the central computer control 306 accesses the information from an electrical power transfer station 308 and/or from an electrical company server 310. The megawatt usage information allows the central computer control 306 to monitor the current amount of power being supplied by the one or more electrical power transfer stations 308.

In embodiments, the central computer control 306 also receives rate information. The rate information is received by the central computer control 306, such as a peak usage parameter explained in conjunction with FIG. 6. For example, the electrical distribution company server 310 provides a rate for each watt or megawatt based on the time of day. In another embodiment, the rate is based on the amount of megawatt usage. Many power companies charge a premium for electricity consumed during peak or near peak usage on the power grid. In embodiments, the peak usage period lasts a short time but varies depending on usage. For example, peak usage for a power grid may occur for an hour but there is no sure way to predict when the peak will begin or how long it will last. The rate charges and scheme for charges is sent to the central computer control 306.

This power usage information and the peak usage parameter may be the most important consideration in sequencing the pivot operations since the pivot pumps and drive motors consume a large amount of power. Therefore, ensuring that the pivot irrigation systems 302 operate in a manner that precludes operation during peak demand represents a savings to the commercial customers, such as the farm operators, in the form of lower rates charged by the power company for such power. The control central computer control 306 in the system 300 is preferably located in the business center, such as a farmhouse. When the system 300 is utilized for irrigation of golf courses, greenbelts, city or community parks, etc., the central computer control 306 may be located in an appropriate central office or business location.

In one embodiment, the central computer control 306 determines if the center pivots 302 and/or the electrical machinery 304 (collectively referred to as "loads") can be powered off at the present time. If the loads can be powered off, the central computer control 306 sends a command to power off the electrical machinery and/or the center pivots. If the loads cannot be powered off for some reason, e.g., the crops being watered require more moisture, the central control computer 306 does not power off the center pivots 302 and/or the electrical machinery 304. In alternative embodiments, the computer 306 determines a subset of the loads, e.g., one or two of the higher consumers of power, and attempts to power off this subset.

In a further embodiment, the central computer control 306 may receive a power request from some other electrical power user 322, such as a power company, a manufacturer, a municipality, or other entity, to request electricity be sold to them. The central computer control 306 can then query for power demands from one or more of center pivots 302 and/or electrical machines 304. The central computer control 306 can then determine from the power demand if the power request can be filled. In this way, the central computer control 306 can control a portion of the load on the power grid and may sell power to another entity. In other instances, the other entity may pay a small fee to the farmer to prevent the occurrence of peak voltage rates. Thus, as the power grid usage approaches peak, other entities may pay the farmer to prevent peak usage by shutting down center pivots 302 and/or the electrical machinery 304. As may be appreciated, as the power demand is reduced, i.e., to below peak usage values, the power can be restored to one or more loads.

In embodiments, each of the pivot controllers 302 may be locally operated or remotely operated by radio signals which override the signals provided from the central computer control 306. These local operations result in changes to the automatic scheduling of operations. The transceivers 302 on the center pivots automatically transmit such local operations data to the central computer control 306 so that the central computer control 306 can account for these changes. These changes may be necessary due to corrective or preventive maintenance being performed on the system components. In addition, the central computer control 306 may be controlled manually to operate the pivot systems 302 as may be from time to time desired.

The system 300, in further embodiments, includes input to the central computer control 306 from a plurality of remote sensors 316, which provide soil condition information, input from a weather satellite 318, and input from GIS and GPS data receivers 312 and 314, which help generate grid maps of each of the irrigation systems 302. The remote sensors 316 provide continuous signals to the central computer control 306 of parameters such as soil moisture, nitrogen, phosphorus, and potassium concentrations at the sensor locations. This information may be used by the central computer control 306 to supplement and/or confirm the remote signals received from the GIS system 312, or may be used in place of such signals, particularly when frequent cloud cover prevents accurate transmission of such data from the GIS satellites.

The central computer control 306 receives, in embodiments, the GPS signals from the receiver 314 and GIS signals from the GIS receiver 312 and generates maps of the agricultural area with the pivot systems 302 and remote sensors 316 accurately positioned or located on the maps. The central computer control 306 then continually updates the maps based on the GIS input, the remote sensor input data, and the input from pivot sensors 302 to generate the soil condition data. Alternatively, the historical weather and soil condition data may be manually input or received from a remote database along with crop data. The central computer control 306 then compares this historical data and/or real time input soil condition data to predetermine irrigation requirements, which are provided to the system operator to determine whether and which irrigation systems should be operated. The central computer control 306 then determines the necessary watering requirements for each pivot system, i.e., the duration of watering required over a predetermined period of time, based on the difference between actual and desired moisture conditions or other differences as preprogrammed by the operator.

In other embodiments, the central computer control 306 also receives input data from a weather satellite 318 either automatically or by manual input of weather data. The software program in the central computer control 306 maps the weather data received or manually input onto the GIS map and modifies the time or duration established for operation of each pivot 302 based on forecasted near term weather conditions. For example, if heavy rain is forecasted for the next twenty four hour period in the vicinity of one of the pivots, the central computer control 306 automatically delays operation of the irrigation system pivot 302 to forgo incurring costs for electrical power during the period of heavy rain.

The central computer control 306 can generate reports and maps of irrigation usage and soil conditions as well as historical data reports from data continuously stored and updated in the database storage device 320, such as a hard disk drive. The central computer control 306 can also issue and automatically transmit appropriate operational signals to each of the pivot system controllers 302.

In embodiments, the central computer control 306 monitors the availability of electrical power from the various power transfer stations or power plants 308 and monitors the demands received from the various pivot irrigations systems 302 tied into the overall irrigation optimization system 300. In addition, the central computer control 306 tracks and stores in a database 320 the duration of usage for each pivot system 302. In embodiments, the central computer control 306 queries the power transfer station 308 and/or the electrical company server 310 to determine the best time for pivot operation and automatically operates the pivots accordingly. The central computer control 306 then can automatically plan when to operate the system to minimize the total cost. Moreover, the system 300 can determine potential peak conditions, such that it can shut down operation and prevent peak charges. The central computer control 306 can then restart the system once the peak condition subsides.

Figure 4:
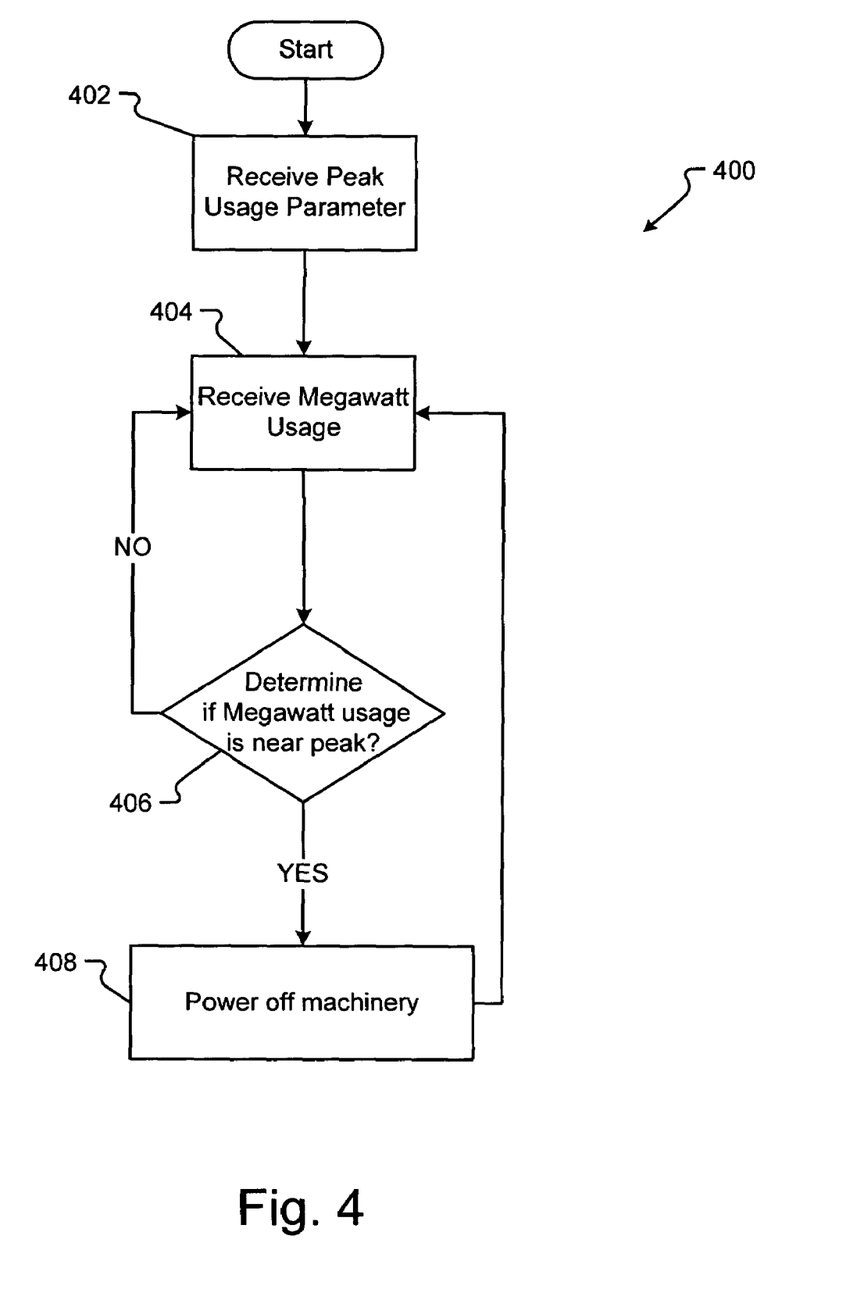
FIG. 4 is a flow diagram representing an embodiment of the present disclosure for controlling electrical machines according to whether power usage is near a peak usage.

An exemplary embodiment of a method for controlling electrical machinery is shown in FIG. 4. Receive operation 402 receives a peak usage parameter. In embodiments, the peak usage parameter is a threshold of megawatt usage on a power grid that delineates megawatt usage for all users on the power grids that is at or above a predetermined value, the value identified as peak usage. In other words, the usage of power on the power grid at or above the peak usage parameter represents peak usage. The peak usage may, in some embodiments, represent a power usage wherein an electrical company charges its highest rates. The receive operation 404 receives the megawatt usage on the power grid. In embodiments, the megawatt usage is the current usage on the power grid. In one embodiment, the power usage is received periodically, such as every few seconds. As explained in conjunction with FIG. 3, the megawatt usage may be sent to a central computer control, such as the central computer control 306 (FIG. 3), or the central computer control may retrieve the megawatt usage from a power transfer station, such as the power transfer station system 308 (FIG. 3), or an electrical company, such as electrical company server 310 (FIG. 3).

Determine operation 406 determines if the megawatt usage is at or near the peak usage parameter. In one embodiment, a power-off threshold is established that is associated with the peak usage parameter, such as 95% of the peak usage parameter. When the megawatt usage reaches the power-off threshold, then the megawatt usage is near the peak usage parameter.

In another embodiment, the megawatt usage is near the peak usage parameter if the megawatt usage will reach the peak usage parameter in a predetermined period of time. For instance, in some cases, powering off the pivots systems takes time. Accordingly, the central computer control 306 may determine that the megawatt usage will reach the peak within some predetermined period of time based on the rate at which other systems are requesting and attempting to consume power. In such an example, power off signals would be delivered to the load(s) with enough time to power off the pivot systems. As such, when megawatt usage will be within a predetermined period of time (determined by the amount of time needed to power of the pivot systems), the megawatt usage is near the peak usage parameter. For example, if it takes four minutes to power off the electrical machinery, then this period of time, four minutes, may be established as the predetermined period of time. The calculated time when the megawatt usage will reach the peak usage parameter is compared to the predetermined time. If the calculated time reaches, i.e., is at or less than, the predetermined period of time, then the megawatt usage is near the peak usage parameter for the purposes of identifying and sending power off signals to some loads.

In embodiments, the rate of increase of megawatt usage is determined. For example, the rate of increase is a moving average of the rates of increase in megawatt usage, e.g., an average rate of increase for the last 10 increases in megawatt usage. To determine the rate of increase, a first value for megawatt usage is subtracted from a subsequent value for megawatt usage. The resultant value is the change or increase in megawatt usage between two periodic measurements of megawatt usage. The current value of the megawatt usage is also tracked.

Also, an amount of increase between the current megawatt usage and the peak usage parameter is calculated. In embodiments, the current megawatt usage is subtracted from the peak usage parameter to derive the amount of increase required to reach the peak usage parameter. Also, the period of updates for the megawatt usage is determined. For example, if a megawatt usage measurement occurs every minute, the period is one minute.

Using these determined values, a time period may be determined for when the megawatt usage will reach the peak usage parameter. The time period may be calculated by dividing the amount of increase to reach the peak usage parameter by the rate of increase and multiplying the result by the period for receiving megawatt measurements. For example, if the peak usage parameter is 1000 megawatts and the current megawatt usage is 900 megawatts, the megawatt usage will reach the peak usage parameter after increasing another 100 megawatts. Further, if the megawatt usage measurements are received every minute (the period of megawatt usage measurements) and the rate of increase is determined to be 25 megawatts per measurement, the megawatt usage will increase 100 megawatts in four minutes. Thus, the megawatt usage will reach the peak usage parameter in four minutes. One skilled in the art will recognize that there are other simple calculations to determine when the megawatt usage will be near the peak usage parameter.

If the megawatt usage is near the peak megawatt usage, the flow branches YES to power off operation 408. Power off operation 408 determines if machinery is on and if so, powers off the electrical machinery, as explained in conjunction with FIG. 5. If the megawatt usage is not near the peak megawatt usage, the flow branches NO to receive operation 404.

As can be appreciated, powering off a large load may cause the megawatt usage to drop below peak usage or may drop enough that it would appear that the load could be powered on again. In embodiments, after powering off the load, the load would not be powered on again for a predetermined period of time, such as 15 minutes. Thus, the effect of the drop in power usage could be assessed and the situation of the load being power on and off in a short period of time could be avoided. In other embodiments, the drop in load could be assessed. The central computer control could measure the drop in megawatt usage from a time just before powering off the load and just after powering off the load. The difference in megawatt usage provides an estimate of the amount of power consumed by the load. As such, the central computer control can prevent the load from powering on again until the megawatt usage is far enough below the peak usage parameter to prevent the power grid from going back into peak usage. In still further embodiments, the central computer control could determine that megawatt usage is decreasing, using similar methods for determining it was increasing, and power on portions of load in a repetitive process to prevent the megawatt usage from going above peak but also providing power to the portions of the load as soon as possible. One skilled in the art will recognize other methods that are within the scope of this disclosure for preventing the inadvertent powering off and on of the load as the megawatt usage goes above and below peak usage.

Figure 5:
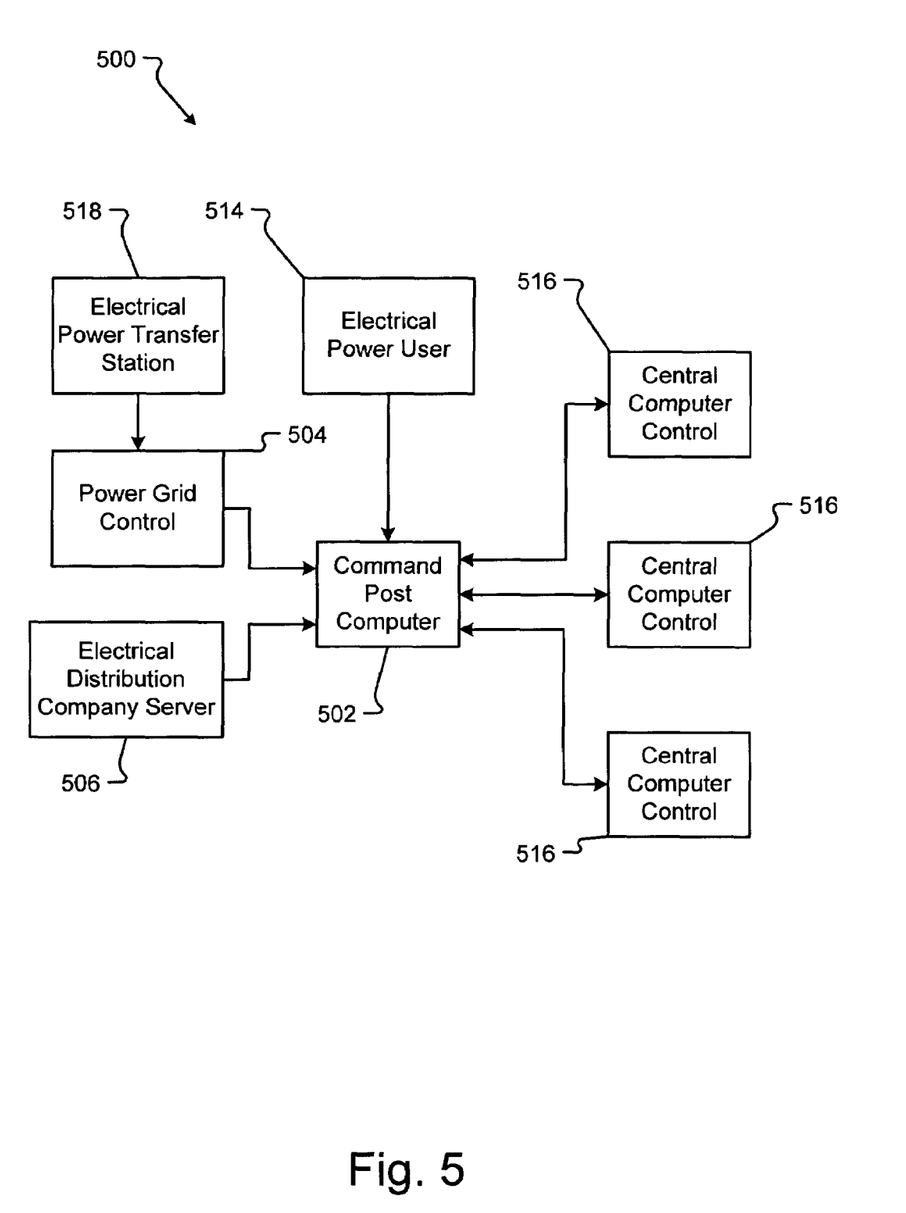
FIG. 5 is a flow diagram representing an embodiment of the present disclosure for controlling electrical machines when another request for electrical power is received.
Figure 6:
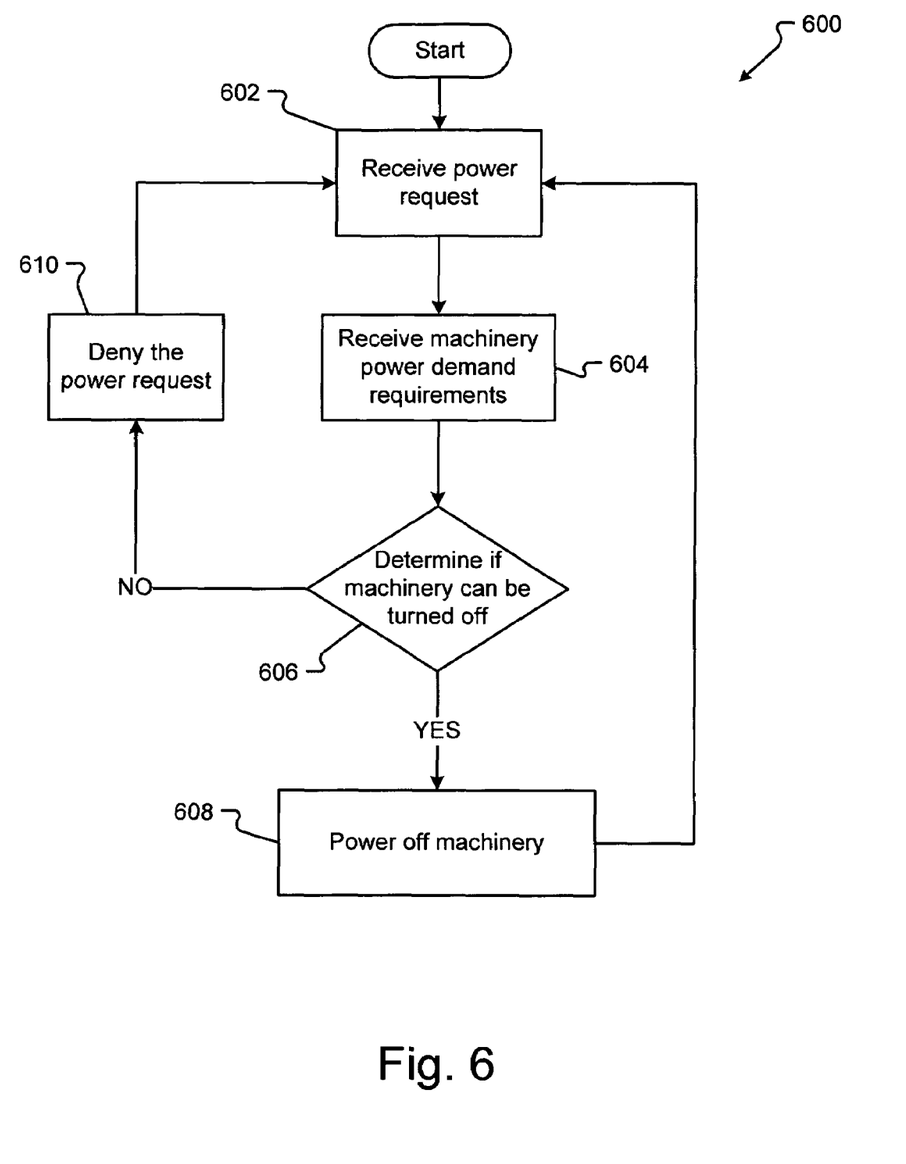
FIG. 6 is a functional diagram illustrating an embodiment of a control system for electrical machines in accordance with the present disclosure.

In accordance with other aspects, embodiments of the invention relate to an optimized system for power companies or third parties in controlling the supply electrical power. The system 500 to control electrical machinery is shown in FIG. 5. In this embodiment, the farmer may subscribe to a service provided by another entity controlling a command post computer 502. In other embodiments, the power company may control the command post computer 502. A command post computer 502 is communicatively coupled to one or more central computer controls 504. Command post computer 502 receives demands for electrical power from one or more central computer controls 516 and provides directives or controls to the central computer control(s) 516. A demand for electrical power may include, but is not limited to, information about how much power an electrical machine is using, how long the electrical machine must operate over a period of time, e.g., four hours per day, or how many electrical machines require power. In embodiments, the command post computer 502 is communicatively coupled to one or more power grid control systems 504 that control one or more electrical power transfer stations 518. The power grid control system 504 provides information about electrical power usage on the one or more electrical power transfer stations 518. In one embodiment, the power grid control system 504 periodically provides information detailing the megawatt usage for the power grid. The information is sent over the Internet to the command post computer 502, and, in other embodiments, the command post computer 502 accesses the information from a power grid control system 504. The megawatt usage information allows the command post computer 502 to monitor the current amount of power being supplied by the one or more electrical power transfer stations 518.

The command post computer 502 is also communicatively coupled to one or more electrical distribution company servers 506. In embodiments, the electrical distribution company server 506 and the power grid control system 504 are two components of the same system. Regardless, the electrical distribution company server 506 provides rate information to the command post computer 502, such as a peak usage parameter explained below in conjunction with FIG. 6. For example, the electrical distribution company server 506 provides a rate for each watt or megawatt based on the time of day. In another embodiment, the rate is based on the amount of megawatt usage. The peak and non-peak rate charges and schema for charges is sent to the command post computer 502.

As explained in conjunction with FIG. 3, the central computer control 306 or 516 is communicatively coupled to one or more center pivots. In further embodiments, the central computer control 516 is communicatively coupled to other types of electrical machinery. For example, the central computer control 516 may be connected to other agricultural equipment, such as pumps, valves, or gates for moving irrigation water. In still further embodiments, the electrical machinery represents machinery that is not used for agricultural purposes, such as oil or natural gas pumps. One skilled in the art will recognize other types of electrical machinery that may be controlled by the central computer control 516.

In one embodiment, the command post computer 502 sends a command to power off the electrical machinery and/or the center pivots. The central computer control 516 determines if the center pivots and/or the electrical machinery can be powered off at the present time. If the center pivots and/or the electrical machinery can be powered off, the central computer control 516 relays or sends the command to the center pivots and/or the electrical machinery. If the center pivots and/or the electrical machinery cannot be powered off, the central control computer 516 refuses to execute the power off request. In another embodiment, the command post computer 502 queries the central computer control 516 if any of the center pivots and/or the electrical machinery can be powered off. If the any center pivots and/or the electrical machinery can be powered off, the command post computer 502 sends the command and the central computer control 516 relays or sends the command to power off to the center pivots and/or the electrical machinery.

In a further embodiment, the command post computer 502 may receive a power request from some other electrical power user 514, such as a power company, a manufacturer, a municipality, or other entity, to request electricity be sold to them. The command post computer 502 can then query one or more central computer controls 516 for power demands of center pivots and/or the electrical machinery. The command post computer 502 can then determine from the power demand if the power request can be filled. In this way, the command post computer 502 can control a significant portion of the load on the power grid and may sell power to another entity if available. In other instances, the other entity may pay a small fee to the command post computer operator to prevent the occurrence of peak voltage rates. Thus, as the power grid usage approaches peak, other entities may pay the command post computer operator to prevent peak usage by shutting down center pivots and/or the electrical machinery.

The embodiments described in conjunction with FIG. 5, provide a third entity the ability to control a large amount of the demand on one or more power grids. If each central computer control can power on or off several pivot systems and the command post computer can control several central computer controls, one command post computer may control a very large portion of the power being consumed on a power grid. As such, the third entity can charge other parties for electricity. In essence, the third party may preclude operating the pivot systems to allow another power consumer to receive power or receive power at a reduced rate.

In further embodiments, the power company may control the command post computer. In this embodiment, the power company can control a large enough portion of the power consumption to level out the demand. In other words, the power company may be able to eliminate peak demand periods or shorten the duration of the peak demand periods by shutting off the pivot systems at the appropriate time. This type of control reduces the cost of electricity for all electricity consumers and lessens the demand on the power grid.

Another exemplary embodiment of a method for controlling electrical machinery is shown in FIG. 6, which, in embodiments, represents a method used by a third party or the power company to control the electrical machinery. Receive operation 602 receives a power request. In embodiments, the power request is a request from another entity for power, such as the electrical power user 514 (FIG. 5). This request may be received by a power company, an intermediate entity, or an operation, as discussed in conjunction with FIG. 6. The request may specify the amount of megawatts required and for how long the demand will continue. Receive operation 604 then receives the power demand requirements of the electrical machinery, such as electrical machinery 304 (FIG. 3). In one embodiment, a command post computer, such as command post computer 502, requests from a central computer control, such as central computer control 516, the power demand requirements of electrical machinery coupled to the central computer control.

Determine operation 606 determines if the machinery can be powered off. In embodiments, the central computer control determines if the electrical machinery needs to remain operating or can be powered off. For example, if a field requires four hours of watering on the particular day, according to a soil moisture sensor, and there are only four hours left in the day, the central computer control will determine that the center pivot must remain operating. In contrast, for example, an oil well may be required to pump 6000 gallons of oil each month. The oil well may have pumped 6100 gallons in the current month. Yet, there may be 4 days left in the month. In this situation, the central computer control can decide that the oil well pump may be powered off. If the machinery cannot be powered off or not enough machinery can be powered off to meet the power request, the flow branches NO to deny operation 610 where the power request is denied. The flow continues to wait for another power request at receive operation 602.

If the machinery can be shut off, the flow branches YES to power off operation 608. Power off operation 608 powers off the machinery. In embodiments, a central computer control, such as the central computer control 306 (FIG. 3), sends a power off command to a center pivot receiver, such as center pivot receiver 106 (FIG. 1), to power off the center pivots. In embodiments, the method 600 can be tailored to power off all, none, or a portion of the electrical machinery. Thus, if only a portion of the electrical machinery needs to be powered off to accommodate the power demand, certain machines may be selected while other machines are not selected to be powered off.

Figure 7:
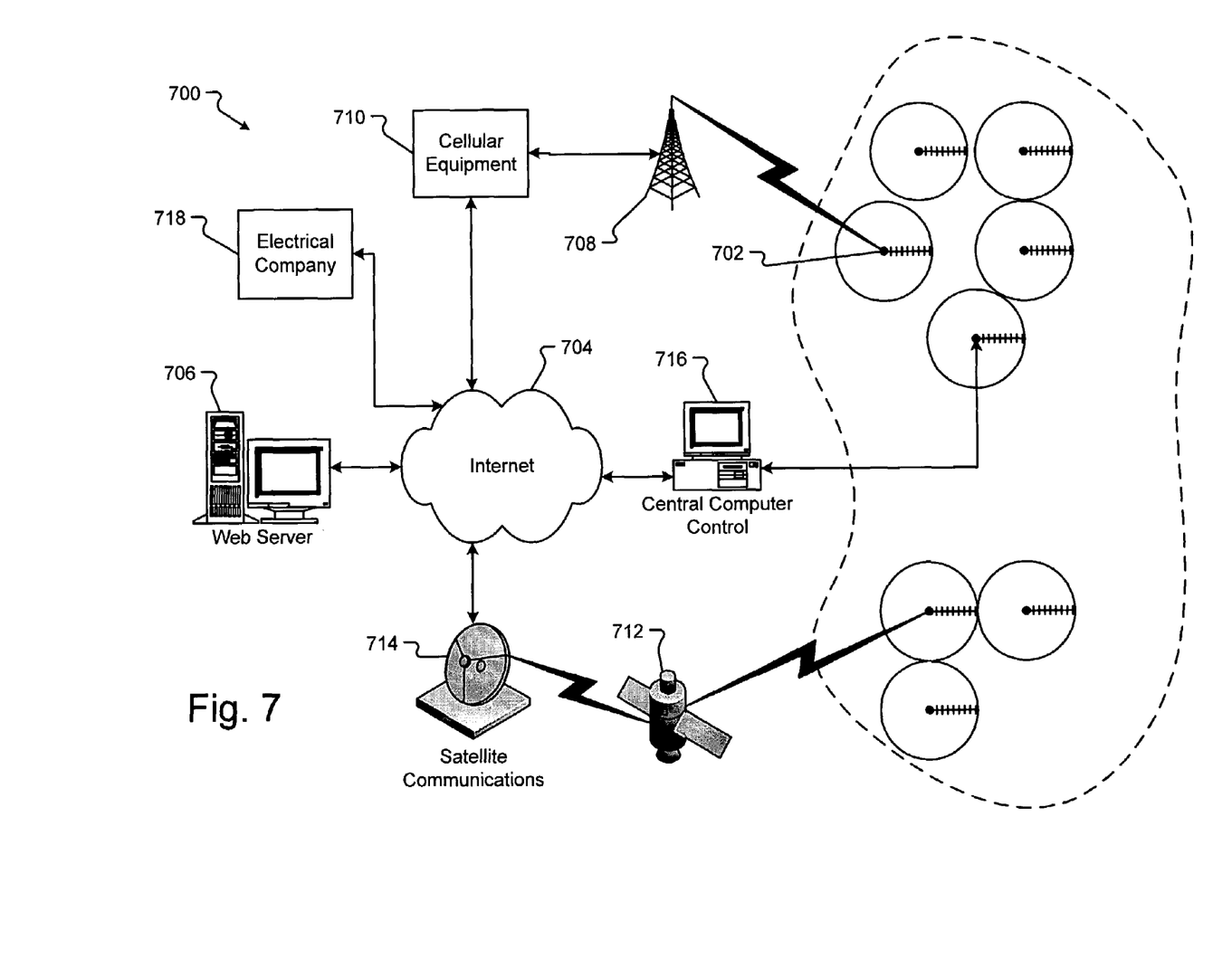
FIG. 7 is another functional diagram illustrating an embodiment of a control system for electrical machines in accordance with the present disclosure.

Another embodiment of a system 700 to control center pivot irrigation 702 or other electrical machinery is shown in FIG. 7. In this embodiment, the communications are sent through the Internet 704 to a web server 706. Thus, instead of a central computer control, the web server 706 provides a website that can be used to collect information about the electrical machinery 702 and send commands to the electrical machinery 702. The embodiment of the present invention shown in FIG. 7 also provides some other communication connections, such as a cellular connection to a cellular tower 708 that can relay information through the cellular equipment 710, onto the Internet 704, and to the web server 706. The cellular connection provides more remote electrical machinery with a connection to the system. In still a further embodiment, some very remote electrical machines may be unable to receive a cellular signal. In these situations, there may be a connection made to a satellite 712 via a satellite transmitter. The satellite 712 relays the information through satellite communications equipment 714, onto the Internet 704, and to the web server 706. In another embodiment, the web server 704 communicates with a central computer control 716 via the Internet 704. Thus, the web server 706 can replace the command post computer, such as command post computer 502 (FIG. 5), and the command post computer's functions. All of these communications systems and methods are known in the art and will not be explained further.

The embodiment shown in FIG. 7 provides another system that can be used to control the electrical machines. For example, the web server 706 issues commands to the center pivot irrigation pump 702 through the Internet 704 and the cellular equipment 710. The commands may go to the equipment directly or to a computer, such as the central computer control 716.

In addition, the electrical company 718 may interface with the web server to obtain information about the electrical machines. For instance, in one embodiment, the electrical company 718 receives load information about certain electrical machines, which are located after a substation in the electrical power grid. Such information may allow the electrical company 718 to remotely read meters or determine power usage without having an employee read a meter at the electrical machine. This embodiment could save the electrical company 718 the expense of manpower used to record power usage.

Although the present disclosure has been described in language specific to structural features, methodological acts, and computer readable media containing such acts, it is to be understood that the appended claims are not necessarily limited to the specific structure, acts, or media described. One skilled in the art will recognize other embodiments or improvements that are within the scope and spirit of the present disclosure. Therefore, the specific structure, acts, or media are disclosed as exemplary embodiments. The invention is defined by the appended claims.

What is claimed is:

1. A method for controlling electrical machinery, comprising:
   receiving a peak usage parameter;
   receiving a current megawatt usage for a power grid;
   comparing the current megawatt usage to the peak usage parameter;
   determining whether one or more electrical machines connected to the power grid can be powered off when the current megawatt usage of the power grid is within a predetermined amount of power of the peak usage parameter; and when it is determined that the one or more electrical machines can be powered off, powering off the one or more electrical machines connected to the power grid.

2. The method of claim 1, wherein the peak usage parameter is a threshold of megawatt usage on a power grid that delineates megawatt usage at or above the peak usage.

3. The method of claim 1, wherein the megawatt usage is received periodically.

4. The method of claim 1, wherein a command post computer receives the peak usage parameter and the current megawatt usage and compares the current megawatt usage to the peak usage parameter.

5. The method of claim 1, wherein comparing comprises:
establishing a power-off threshold that is correlated to the peak usage parameter; and
determining if the current megawatt usage reaches the power-off threshold.

6. The method of claim 1, wherein comparing comprises:
establishing a predetermined period of time;
calculating a time when the megawatt usage will reach the peak usage parameter; and
comparing the calculated time to the predetermined period of time.

7. The method of claim 6, wherein the predetermined period of time is an amount of time needed to power off the electrical machinery.

8. The method of claim 6, wherein calculating a time comprises:
determining a rate of increase of megawatt usage;
determining an amount of increase of megawatt usage needed to reach the peak usage parameter;
determining a period for receiving megawatt usage measurements; and
dividing the amount of increase by the rate of increase and multiplying by the period.

9. The method of claim 1, wherein the electrical machines are pivot wells.

10. A system for controlling electrical machinery, comprising:
one or more electrical machines connected to one or more power grids;
one or more central computer controls, communicatively coupled to one or more of the electrical machines, that control one or more the electrical machines; and
a command post computer, communicatively coupled to the one or more central computer controls, configured to compare a peak usage parameter and a megawatt usage for the one or more power grids and send a power off request to one or more of the central computer controls, wherein the central computer controls are configured to relay the power off request to the one or more electrical machines when it is deternained that the one or more electrical machines can be powered off.

11. The system of claim 10, wherein the command post computer is communicatively coupled to one or more power grid control computers to periodically receive the megawatt usage for the one or more power grids.

12. The system of claim 10, wherein the command post computer is communicatively coupled to one or more electrical distribution company servers to periodically receive the peak usage parameter.

13. The system of claim 10, wherein the command post computer receives an electrical power demand from one or more central control computers and determines if the power off request can be sent.

14. The system of claim 13, wherein the central control computer is communicatively coupled to one or more other systems to receive information to compile the electrical power demand.

15. The system of claim 10, wherein one or more of the electrical machines are pivot wells.

16. The system of claim 10, wherein the central control computer receives the power off request, determines if the one or more electrical machines can bc powered off, and, if the one or more electrical machines cannot be powered off, refuses to execute the power off request.

17. The system of claim 10, wherein the command post computer queries the central control computer to determine if one or more of the electrical machines can be powered off and, if one or more of the electrical machines can be powered off, sends the power off request.

* * * * *